R. L. CLARK.
ROBE HOLDER.
APPLICATION FILED DEC. 9, 1919.
1,342,274.
Patented June 1, 1920.
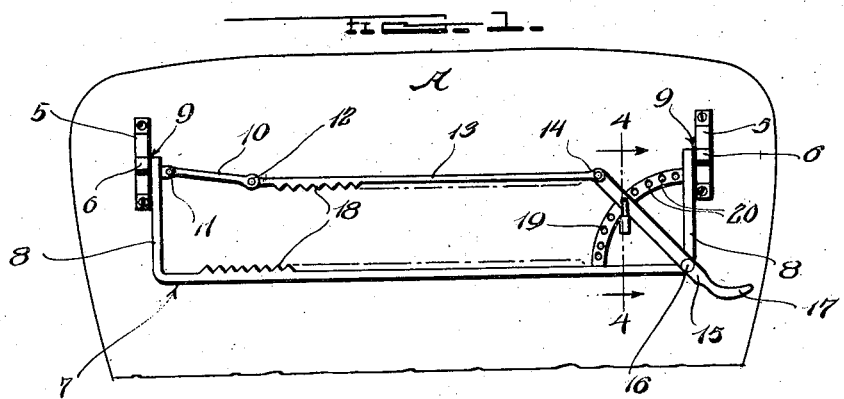
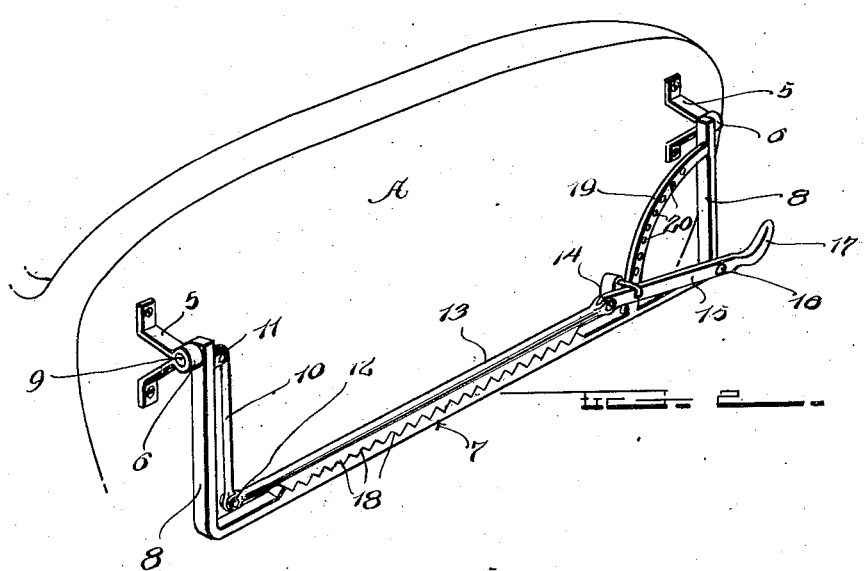
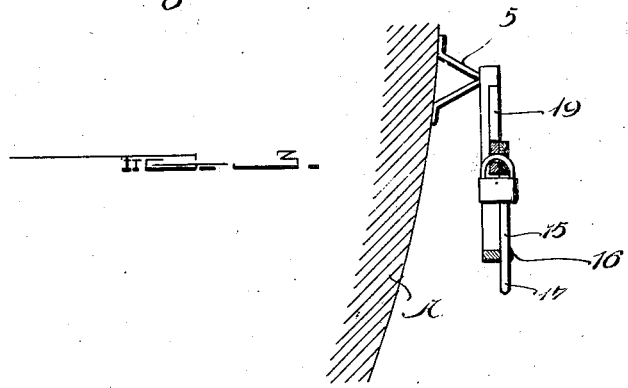
Inventor
R. L. Clark
By Geo. F. Kimmel
Attorney

UNITED STATES PATENT OFFICE.

ROBERT L. CLARK, OF UNION, WEST VIRGINIA.

ROBE-HOLDER.

1,342,274.  Specification of Letters Patent.  Patented June 1, 1920.

Application filed December 9, 1919. Serial No. 343,582.

*To all whom it may concern:*

Be it known that I, ROBERT L. CLARK, a citizen of the United States, residing at Union, in the county of Monroe and State of West Virginia, have invented certain new and useful Improvements in Robe-Holders, of which the following is a specification.

The invention relates to a robe holder, and more particularly to the class of robe rails for use in automobiles or other vehicles.

The primary object of the invention is the provision of a holder or rail of this character, wherein the same is supported upon the back of the front seat of an automobile or other vehicle, so that robes, wraps or other articles can be hung thereon and securely fastened to prevent the loss thereof or the surreptitious removal thereof from the holder or rail.

Another object of the invention is the provision of a holder or rail of this character, wherein the locking means to fasten the robes, wraps or other articles thereon is of novel construction, so that the same can be readily operated for the fastening of the robes, wraps or other articles on the holder or rail or the removal of the same therefrom at the option of the user of the holder or rail.

A further object of the invention is the provision of a holder or rail of this character, which is extremely simple in construction, readily and easily operated, neat in appearance, strong, durable, and inexpensive to manufacture and install.

With these and other objects in view, the invention consists in the features of construction, combination and arrangement of parts, as will be hereinafter fully described, illustrated in the accompanying drawings and pointed out in the claims hereunto appended.

In the accompanying drawings:

Figure 1 is a fragmentary elevation looking toward the back of the front seat of an automobile showing the robe holder or rail constructed in accordance with the invention applied thereto, the locking device being in open position.

Fig. 2 is a perspective view of the holder showing the locking device in closed position.

Fig. 3 is a detail sectional view taken through the lock engaging bar or segment.

Similar reference characters indicate corresponding parts throughout the several views in the drawings.

Referring to the drawings in detail A designates generally the back of the front seat of an automobile or other vehicle, which is of any ordinary construction and is shown merely to illustrate the mounting and the manner of use of the robe holder or rail hereinafter fully described. Suitably mounted upon the back of the seat A are spaced brackets or hangers 5 each being formed with a pivot bearing 6 for swingingly supporting the robe holder or rail, which comprises a substantially U-shaped frame 7 the side limbs 8 of which are pivoted at 9 in the bearings 6 of the brackets or hangers 5 for the free swinging movement of said frame to permit the hanging of a robe, wraps or other articles thereon.

Swingingly connected to one of the arms 8 of the frame 7 contiguous to its pivot 9 with the bearing 6 is a lever 10, the same being preferably pivoted as at 11 for swinging movement and also pivoted to this lever at 12 is one end of a keeper rod 13, which at its other end is pivoted at 14 to a lever 15 which is swingingly connected to the frame 7 by a pivot 16 mounted at the juncture of said frame with the other arm 8, the lever 15 being formed with a handle 17 so that it may be manually operated to bring the keeper rod 13 toward and away from the intermediate portion of the frame 7, the latter and said rod 13 being formed with biting teeth 18 to assure a firm grip upon a robe, wrap or other article when hung upon the said frame.

Extended from the frame between the arms 8 thereof and connected therewith and also with one of the arms 8 to lie crosswise of the lever 15 is a substantially segment shaped bar 19 which has formed therein at intervals holes 20 in any one of which is adapted to be engaged a suitable pad lock, so that the lever 15 can be held fast when in position for holding the keeper rod 13 close to the frame 7 for the retention of a robe, wrap or the like upon the frame, and thereby prevent the surreptitious removal of the same or the accidental falling of said wraps or other articles therefrom when hung thereon.

It will be clearly apparent that on manually manipulating the handle 17 the lever 15 can be swung in a direction to move the keeper rod 13 close to the frame 7 or away from the same and in this manner a robe, wraps or other articles can be clamped upon the frame 7 or freed therefrom for the removal of the same.

From the foregoing it is thought that the construction and manner of operation of the holder or rail can be clearly understood and therefore a more extended explanation has been omitted.

What is claimed is:

1. A holder of the character described comprising a swingingly supported frame, a keeper rod coöperating with said frame, means swingingly supporting said keeper rod to move the same toward and away from the frame, and a hand lever for said means.

2. A holder of the character described comprising a swingingly supported frame, a keeper rod coöperating with said frame, means swingingly supporting said keeper rod to move the same toward and away from the frame, a hand lever for said means, means on the frame and rod to assure a firm grip upon an article when engaged therebetween, and a lock engaging bar on the frame and adapted for the engagement of a lock therewith for the fastening of said means.

3. A holder of the character described comprising supporting brackets, a substantially U-shaped frame swingingly connected to said brackets, levers supported on the frame, a keeper rail pivotally connected to said levers and adapted to move toward and away from the frame, a handle on one of said levers, and a lock engaging bar on the frame and adapted for the connection of the lock therewith to fasten the adjacent lever against movement.

In testimony whereof I affix my signature hereto.

ROBERT L. CLARK.